United States Patent [19]

Johnson et al.

[11] Patent Number: 5,227,956

[45] Date of Patent: Jul. 13, 1993

[54] SPRING MOUNTING OF MULTI-LAYERED ELECTRONIC ASSEMBLIES

[75] Inventors: Robert A. Johnson, Seguin; Agustin O. Morin, San Antonio; David B. Fiedler, New Braunfels, all of Tex.

[73] Assignee: Motorola, Inc., Schaumburg, Ill.

[21] Appl. No.: 810,046

[22] Filed: Dec. 19, 1991

[51] Int. Cl.[5] .............................................. H05K 7/12
[52] U.S. Cl. .................................... 361/395; 361/417; 248/624; 248/626
[58] Field of Search ............... 248/624, 626, 632, 638; 312/8; 361/380, 392, 395, 396, 417, 419, 424

[56] References Cited

U.S. PATENT DOCUMENTS

| | | | |
|---|---|---|---|
| 2,867,405 | 1/1959 | Carriston | 248/638 X |
| 3,668,476 | 6/1972 | Wrabel et al. | 361/395 X |
| 5,001,603 | 3/1991 | Villaneuva, III et al. | 361/395 X |

Primary Examiner—Leo P. Picard
Assistant Examiner—Michael W. Phillips
Attorney, Agent, or Firm—Jeffery D. Nehr

[57] ABSTRACT

A method and apparatus for spring mounting of multi-layered electronic assemblies including a top cover; a bottom cover; first, second, and third mounting supports; a printed wiring board in contact with and supported by the first, second and third mounting supports at first, second, and third mounting locations, respectively; springs for clamping the multi-layered electronic assembly between the top cover and the bottom cover; a load plate for supporting the assembly, the load plate including fourth, fifth, and sixth mounting supports aligning with the first, second, and third mounting locations, respectively, and in contact with the springs; and the top cover contacting the load plate and coupled to the bottom cover, wherein the coupling of the top cover and bottom cover compresses the springs and securely clamps the multi-layered electronic assembly within the top and bottom covers.

9 Claims, 3 Drawing Sheets

SPRING MOUNTING OF MULTI-LAYERED ELECTRONIC ASSEMBLIES

FIELD OF THE INVENTION

This invention relates in general to the field of packaging of electronic assemblies, and in particular to the spring mounting of multi-layered electronic assemblies.

BACKGROUND OF THE INVENTION

Traditional packaging of multi-layered electronic assemblies involves a large number of close tolerance parts which must be assembled with screws or other fasteners. During actual assembly of the electronic product, access to different regions within the product case or cover is typically required at different times to make electrical interconnections or to fasten components to each other or to the cover. Such access to the product is typically required along several axes, and therefore such a method typically involves a relatively long assembly time, increasing the cost of the product produced. In addition, since component parts must fit within relatively close tolerances to physically enable the assembly of the product, the cost of components is increased.

In assembling an economical telephone terminal, specifically the Super Economical Terminal (SET) manufactured by Motorola, Inc., a need existed to provide a method for assembly of the phone terminal by connecting components along only one dimension or axis (i.e., "Z-axis" assembly). The need also existed to devise a method and terminal that did not require close tolerance parts or the use of fasteners in terminal assembly, yet which would securely hold the multi-layered electronic assembly inside the SET within the cover.

SUMMARY OF THE INVENTION

Accordingly, it is an advantage of the present invention to provide a new and improved method and apparatus for the spring mounting and clamping of multi-layered electronic assemblies. It is a further advantage of the present invention to provide a method and apparatus for the assembly of a multi-layered electronic assembly which does not require a large number of close tolerance parts which are fastened with screws or rivets, etc. It is also an advantage of the present invention to provide a method and apparatus for the assembly of a multi-layered electronic assembly which compensates for varying component assembly tolerances, is relatively quick to assemble and which has a relatively low cost. It is a further advantage that the method and apparatus are adaptable to electronic assemblies of varying size, shape, and function.

To achieve these advantages, an apparatus for the spring mounting of multi-layered electronic assemblies is contemplated which includes a top cover; a bottom cover including first, second, and third mounting supports; a first printed wiring board in contact with and supported by the first, second and third mounting supports; springs for clamping the multi-layered electronic assembly between the top cover and the bottom cover, the springs in contact with the first printed wiring board; a load plate for stabilizing the multi-layered electronic assembly, the load plate including fourth, fifth, and sixth mounting supports aligning with the first, second, and third mounting supports and in contact with the springs; and the top cover contacting the load plate and coupled to the bottom cover, wherein the coupling of the top cover and bottom cover compresses the springs and clamps the multi-layered electronic assembly within the top and bottom covers.

Furthermore, the method for assembling a multi-layered electronic assembly package comprises the steps of providing a top cover and a bottom cover; providing first, second, and third mounting supports on the bottom cover; stabilizing a first printed wiring board with the first, second and third mounting supports; providing fourth, fifth, and sixth mounting supports on a load plate, the fourth, fifth, and sixth mounting supports aligning with the first, second, and third mounting supports, respectively; aligning the fourth, fifth, and sixth mounting supports of the load plate with the first printed wiring board at the first, second, and third mounting supports, respectively; providing a plurality of springs; placing the plurality of springs in contact with the load plate; placing the top cover in contact with the load plate; compressing the plurality of springs with the top cover; and coupling the top cover and bottom cover, thereby clamping the aligned multi-layered electronic assembly within the top and bottom covers.

The above and other features and advantages of the present invention will be better understood from the following detailed description taken in conjunction with the accompanying drawings.

DETAILED DESCRIPTION OF THE PREFERRED EMBODIMENT

Figure 1:
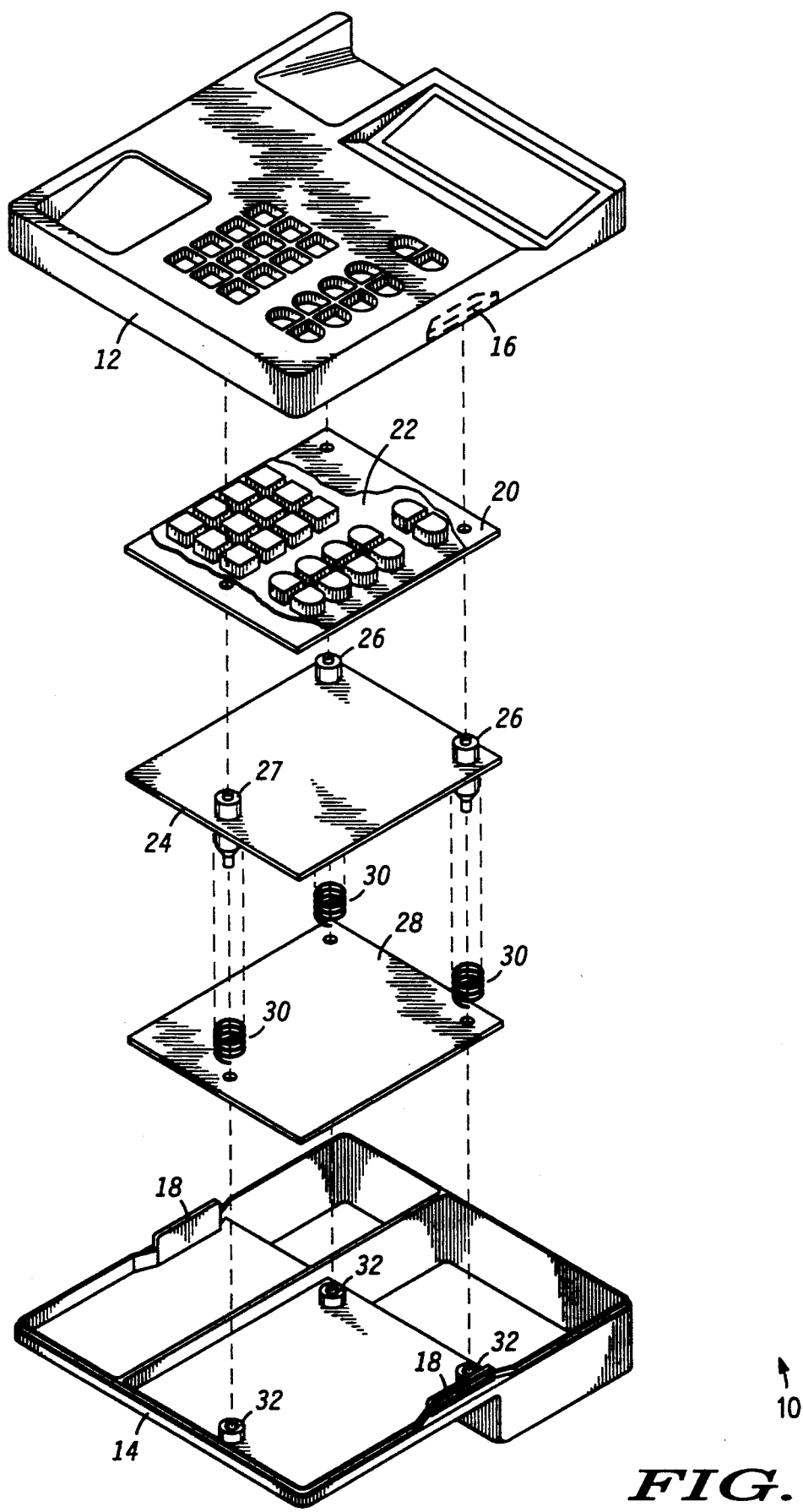
In FIG. 1, there is shown an exploded view of a multi-layered electronic assembly for a telephone terminal using spring mounting in accordance with a preferred embodiment of the invention.

FIG. 1 illustrates an exploded view of a multi-layered electronic assembly for a telephone terminal using spring mounting. A telephone terminal is representative of a multi-layer electronics assembly package in which spring mounting in accordance with a preferred embodiment of the invention can be accomplished.

Telephone terminal 10 includes a case comprising top cover 12 and bottom cover 14. The male portion 16 of a snap fitting on the top cover 12, and the female portion 18 of a snap fitting on the bottom cover 14, when snapped together, hold the telephone terminal case securely together.

The interior of the electronic assembly of telephone terminal 10 comprises a printed wiring assembly 20, a keypad 22, load plate 24, edge mounting posts or supports 26, a center mounting post or support 27, a printed wiring assembly 28, springs 30, and mounting bosses 32 in the bottom cover 14.

The method and assembly system described allow for "Z-axis" assembly of the telephone terminal 10. The Z-axis in FIG. 1 is the axis along which FIG. 1 is "exploded".

Because electrical connections, such as connections between printed wiring assemblies, can be accomplished as is ordinarily accomplished in the art, such connections are not shown in the figures and are not discussed in the description of the assembly of telephone terminal 10.

The load plate 24 provides for the stability of the interior electronic assembly of the telephone terminal 10 and the load plate 24 should be comprised of relatively stiff material. The mounting supports 26 and 27, attached to the load plate 24, define three non-colinear points at their points of furthest extent from each side of load plate 24, and thus describe two planes in space which support adjacent layers in the interior of the electronic assembly of telephone terminal 10. The mounting supports 26 and 27 should be relatively widely spaced from each other on load plate 24 to maximize the stability they provide to the other interior electronic assembly components of telephone terminal 10.

The load plate 24 can also be comprised of electrically conductive material such as metal or may be made of a plastic material laminated to a conductive layer and be sufficiently large to enclose the digital printed wiring assembly 28 when installed against an electrically conductive bottom case 14 e.g. a case made of metal. As such, the enclosure of printed wiring assembly 28 can provide electromagnetic shielding.

On a first side of load plate 24, mounting supports 26 and 27 contact printed wiring assembly 20. Mounting supports 26 and 27 can be comprised of relatively large diameter cylinder or post immediately adjacent to the surface of the load plate 24 and a relatively smaller diameter cylinder or post extending coaxially from the large diameter cylinder further away from the surface of the load plate 24.

Printed wiring assembly 20 can have holes at locations which correspond to and align with the smaller diameter posts of mounting supports 26 and 27. During assembly of telephone terminal 10, the smaller diameter posts of mounting supports 26 and 27 can be aligned with the holes in printed wiring assembly 20. The smaller diameter posts of mounting supports 26 and 27 can also be made to correspond to mounting boss locations in the top cover 12 of the telephone terminal 10. When telephone terminal 10 is fully assembled, the smaller diameter posts of mounting supports 26 and 27 can be aligned with the corresponding small diameter mounting bosses in the top cover 12.

On a second side of load plate 24, mounting supports 26 and 27 contact printed wiring assembly 28. Mounting supports 26 and 27 can be comprised of relatively large diameter cylinders or posts immediately adjacent to the surface of the load plate 24 and a relatively smaller diameter cylinders or posts extending coaxially from the large diameter cylinders further away from the second surface of the load plate 24.

Printed wiring assembly 28 can also have holes through the printed wiring assembly 28 at locations which also correspond to and align with the smaller diameter posts of mounting supports 26 and 27. The holes in printed wiring assembly 28 can be of slightly larger diameter than the relatively small diameter posts of mounting supports 26 and 27.

Figure 3:
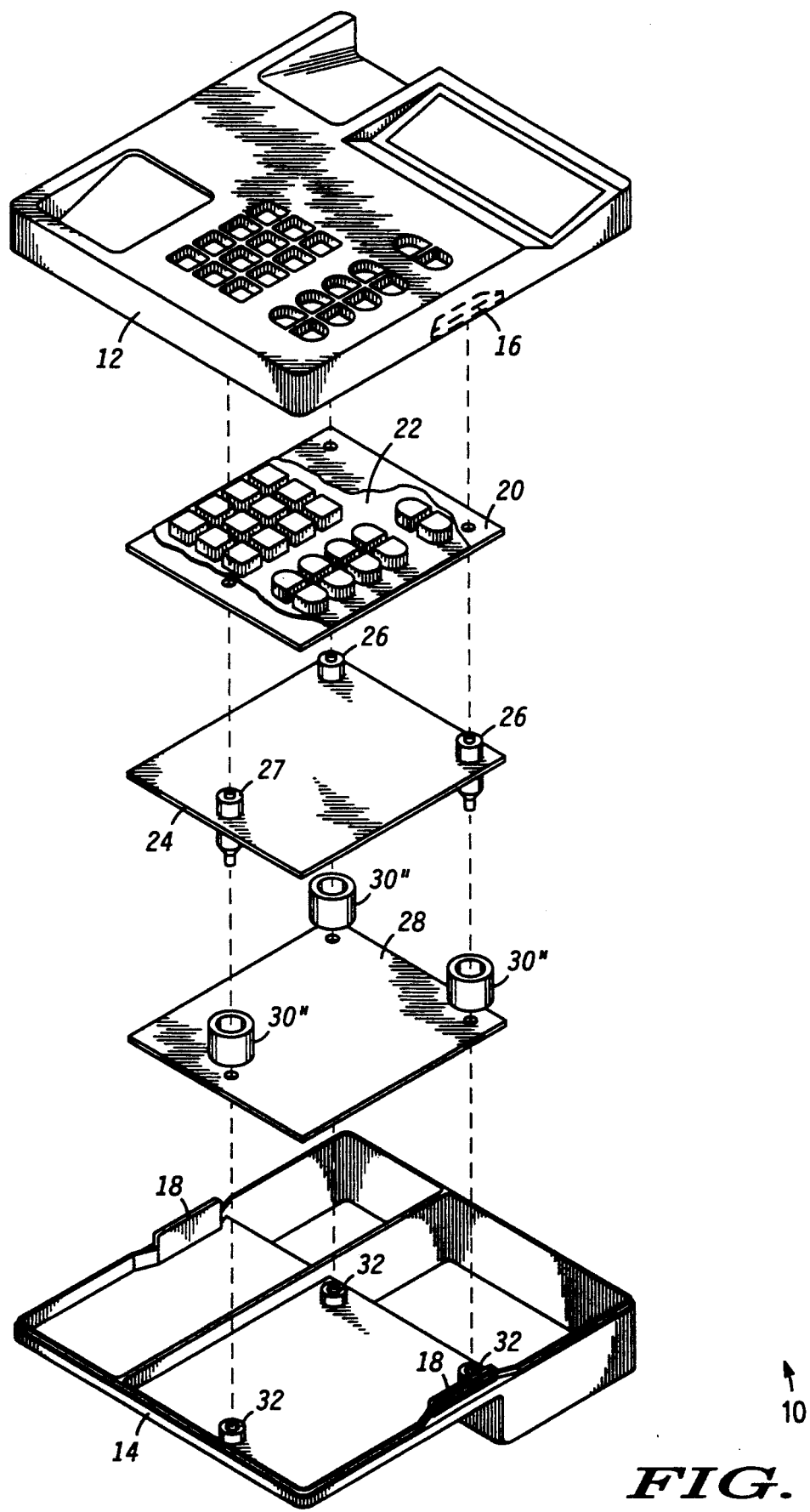
In FIG. 3, there is shown an exploded view of a multi-layered electronic assembly for a telephone terminal using elastomeric foam springs in accordance with a preferred embodiment of the invention.

Springs 30, which in the preferred embodiment represented in FIG. 1 can be coil springs or springs 30", which in the preferred embodiment represented in FIG. 3 can be springs made of elastomeric foam with a central hole of diameter slightly larger than the large diameter of the post of mounting supports 26 and 27, can be placed coaxially over the support posts 26 and 27 during assembly of the telephone terminal 10. The springs 30 can therefore located between the load plate 24 and the printed wiring assembly 28 when the load plate 24 and the printed wiring assembly 28 are aligned and placed as adjacent layers in the electronic assembly of telephone terminal 10.

During assembly of telephone terminal 10, with load plate 24 and printed wiring assembly 20 aligned together and spaced apart by the length of the large diameter portions of mounting posts 26 and 27, and the load plate 24 and the printed wiring assembly 28 aligned together and spaced by springs 30, keypad 22 can be placed on the surface of printed wiring assembly 20. The resulting layered structure, comprising the layers of the keypad 22, the printed wiring assembly 20, the load plate 24, and the printed wiring assembly 28 can then placed in the bottom cover 14 of the telephone terminal 10 so that the small diameter posts of mounting supports 26 and 27 protruding through the printed wiring assembly 28 align with mounting bosses 32 in the bottom cover 14. The top cover 12 of the telephone terminal 10 can then be aligned with the bottom cover 14 and the top cover 12 and the bottom cover 14 snapped together with the male portion 16 and the female portion 18 of snap fittings.

The length of the assembled layered structure of the interior components of telephone terminal 10 along the Z-axis (i.e., the interior assembly height with springs 30 uncompressed) is designed to be slightly greater that the interior height of the telephone terminal 10 between the top cover 12 and bottom cover 14 when the cover halves are snapped together. Because the holes in printed wiring assembly 28 are of slightly larger diameter than the relatively small diameter posts of mounting supports 26 and 27, load plate 24 and printed wiring assembly 28 are pressed together during telephone terminal 10 assembly when the top cover 12 and the bottom cover 14 are snapped together, compressing springs 30. Thus, along the Z-axis direction, springs 30 force printed wiring assembly 28 against the mounting bosses 32 of the bottom cover 14 and simultaneously force load plate 24 against the combination of printed wiring assembly 20 and keypad 22. The combination of printed wiring assembly 20 and keypad 22 is consequently forced against top cover 12. The multi-layer interior assembly of telephone terminal 10 is therefore held securely by spring compression between the top cover 12 and the bottom cover 14 of the telephone terminal 10.

Figure 2:
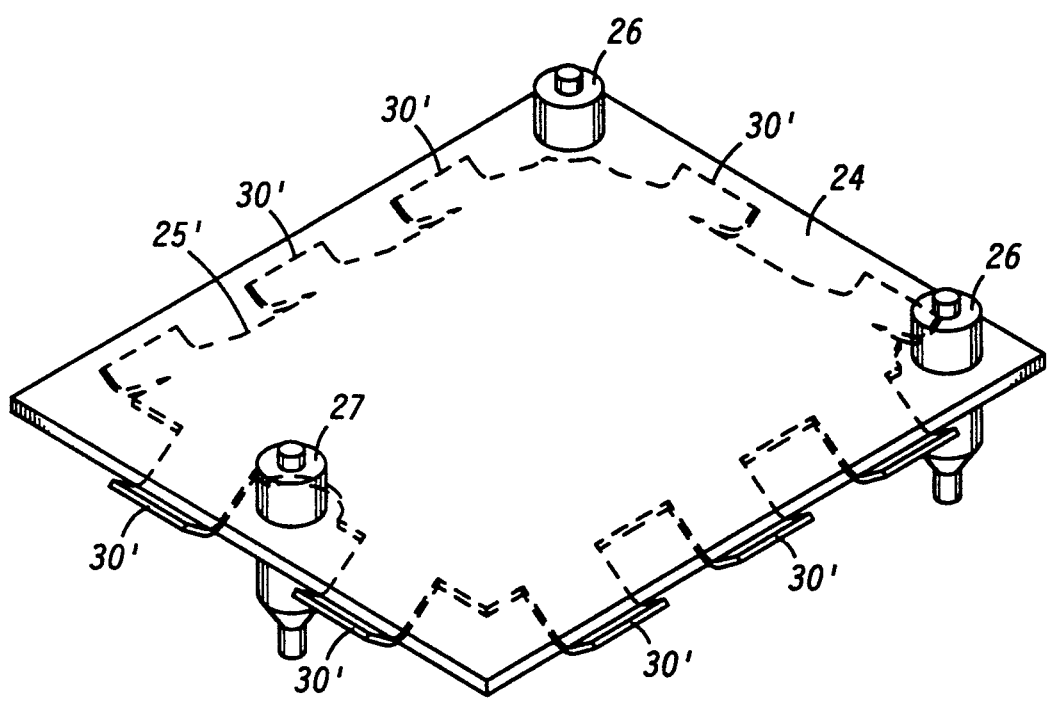
In FIG. 2, there is shown an alternate embodiment of a load and spring mounting plate for the multi-layered electronic assembly in the telephone terminal of FIG. 1.

FIG. 2 illustrates an alternative spring mounting technique in accordance with another preferred embodiment of the present invention. FIG. 2 illustrates an alternative load plate 24 to load plate 24 in FIG. 1. The alternative load plate 24 in FIG. 2 maintains mounting supports 26 and 27 as in the case of FIG. 1, but provides for spring action by means of a spring plate 25' immediately adjacent to the load plate 24. Spring plate 25' is slightly smaller in extent than the load plate 24, but comprises cantilevered spring fingers 30' which extend from the outer edges of spring plate 25' and along the Z-axis (i.e., downward, away from the plane defined by the load plate 24). The alternative load plate 24 and spring plate 25' apparatus of FIG. 2 can substitute for the load plate 24 and springs 30 of FIG. 1 to provide the necessary spring mounting of the multi-layer interior assembly of telephone terminal 10.

FIG. 3 is identical to FIG. 1, except FIG. 3 illustrates an alternative embodiment with elastomeric foam springs 30".

Thus, there has been described a method and apparatus for spring mounting of multi-layered electronic assemblies which overcomes specific problems and accomplishes certain advantages relative to prior art methods and mechanisms. The improvements are significant. The method and apparatus provides for the assembly of a multi-layered electronic assembly without requiring a large number of close tolerance parts which are fastened with screws or rivets, etc. The apparatus for the assembly of a multi-layered electronic assembly also compensates for varying component assembly tolerances, is relatively quick to assemble and therefore has a relatively low cost. The method and apparatus are adaptable to electronic assemblies of varying size, shape, and function.

Thus, there has also been provided, in accordance with an embodiment of the invention, a method and apparatus for spring mounting of multi-layered electronic assemblies which overcomes specific problems and accomplishes certain advantages and which fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. An assembly system packaging a multi-layered electronic assembly comprising:
    a top cover;
    a bottom cover including first, second, and third mounting supports;
    a first printed wiring board in contact with and supported by the first, second and third mounting supports;
    spring means clamping the multi-layered electronic assembly between the top cover and the bottom cover, the spring means in contact with the first printed wiring board;
    load plate means for stabilizing the multi-layered electronic assembly, the load plate means including fourth, fifth, and sixth mounting supports aligning with the first, second, and third mounting supports and in contact with the spring means; and
    the top cover contacting the load plate means and coupled to the bottom cover, wherein the coupling of the top cover and bottom cover compresses the spring means and clamps the multi-layered electronic assembly within the top and bottom covers.

2. An assembly system as claimed in claim 1, wherein the assembly system further comprises a second printed wiring board mounted between a plane defined by furthest extension of the fourth, fifth, and sixth mounting supports from a first side of the load plate and the top cover.

3. An assembly system as claimed in claim 2, wherein there is further included a keypad is inserted between the second printed wiring board and the top cover, with the keypad comprising keys which protrude through holes in the top cover.

4. An assembly system as claimed in claim 3, wherein the multi-layered electronic assembly comprises a telephone terminal.

5. An assembly system as claimed in claim 2, wherein the load plate means and the bottom cover comprise metal and the load plate means and the bottom cover enclose the first printed wiring board.

6. An assembly system as claimed in claim 2, wherein the load plate means comprises plastic laminated to a conductive layer and the bottom cover comprises conductive material, and the load plate means and the bottom cover enclose the first printed wiring board.

7. An assembly system as claimed in claim 2, wherein the spring means comprises a plurality of cantilevered leaf spring fingers.

8. An assembly system as claimed in claim 2, wherein the spring means comprises elastomeric foam springs.

9. A spring plate means as claimed in claim 2, wherein the spring means comprises a plurality of coil springs.

* * * * *